(12) United States Patent
Craft, Jr. et al.

(10) Patent No.: US 11,611,214 B2
(45) Date of Patent: Mar. 21, 2023

(54) POWER ISOLATION SYSTEMS AND DEVICES FOR MICRO GRIDS FOR INFORMATION AND COMMUNICATION TECHNOLOGY INFRASTRUCTURE AND RELATED METHODS OF PROVIDING POWER TO MICRO GRIDS

(71) Applicant: CommScope Technologies LLC, Hickory, NC (US)

(72) Inventors: Thomas F. Craft, Jr., Murphy, TX (US); Willis F. James, Wylie, TX (US); David A. Winkler, Arlington, VA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 127 days.

(21) Appl. No.: 17/335,452

(22) Filed: Jun. 1, 2021

(65) Prior Publication Data
US 2021/0399548 A1   Dec. 23, 2021

Related U.S. Application Data

(60) Provisional application No. 63/034,097, filed on Jun. 3, 2020.

(51) Int. Cl.
*H02J 3/14* (2006.01)
*H02J 3/00* (2006.01)

(52) U.S. Cl.
CPC .............. *H02J 3/144* (2020.01); *H02J 3/003* (2020.01)

(58) Field of Classification Search
CPC .................................. H02J 3/144; H02J 3/003
(Continued)

(56) References Cited

U.S. PATENT DOCUMENTS

| 2007/0081553 A1 | 4/2007 | Cicchetti et al. |
| 2019/0280895 A1* | 9/2019 | Mather ............ H04L 12/40045 |
| 2020/0092118 A1 | 3/2020 | Zhuang et al. |

FOREIGN PATENT DOCUMENTS

| WO | 2018017544 A1 | 1/2018 |
| WO | 2020018478 A1 | 1/2020 |

OTHER PUBLICATIONS

"International Search Report and Written Opinion of the International Searching Authority", International Application No. PCT/US2021/035138, dated Nov. 8, 2021, 18 pp.
(Continued)

*Primary Examiner* — Jigneshkumar C Patel
(74) *Attorney, Agent, or Firm* — Myers Bigel, P.A.

(57) ABSTRACT

A power system includes a power sourcing device, a first splice enclosure including a first power input port, a first power output port, and a first power tap port that is connected to a first remote powered device, and a second splice enclosure including a second power input port, a second power output port, and a second power tap port that is connect to a second remote powered device. The power system includes a composite power-data cable configured to carry power signals transmitted from the power sourcing device to the first splice enclosure and to the second splice enclosure. The power sourcing device is configured to disable the power signals to at least one of the first power input port, the first power output port, or the first power tap port of the first splice enclosure without disabling the power signals at the second splice enclosure.

7 Claims, 9 Drawing Sheets

(58) Field of Classification Search
USPC .......................................................... 700/295
See application file for complete search history.

(56) References Cited

OTHER PUBLICATIONS

"Invitation to Pay Additional Fees and, Where Applicable, Protest Fee", International Application No. PCT/US2021/035138, Sep. 16, 2021, 12 pp.
Craft, Jr., Thomas F., et al., "Cable for Distributing Network Power and Data", U.S. Appl. No. 63/026,291, filed May 18, 2020, 27 pp.

* cited by examiner

Communicating with the first splice enclosure and/or the second splice enclosure through control wires in the composite power-data cable — 910

*Fig. 9*

Start

Detecting an open circuit on at least one of a plurality of continuity wires in the composite power-data cable — 1010

Transmitting, through the control wires, an indication to disable the power signals at the first splice enclosure responsive to detecting the open circuit — 1020

*Fig. 10*

POWER ISOLATION SYSTEMS AND DEVICES FOR MICRO GRIDS FOR INFORMATION AND COMMUNICATION TECHNOLOGY INFRASTRUCTURE AND RELATED METHODS OF PROVIDING POWER TO MICRO GRIDS

CROSS-REFERENCE TO RELATED APPLICATION

The present application claims priority to U.S. Provisional Patent Application Ser. No. 63/034,097, filed Jun. 3, 2020, the entire content of which is incorporated herein by reference.

FIELD

The present invention relates to information and communication technology systems and, more particularly, to selectively disabling electric power connectivity to remote devices in such systems.

BACKGROUND

In many information and communication technology systems, network-connected electronic devices are deployed in locations where a local electric power source is not available. With the proliferation of the Internet of Things ("IoT"), autonomous driving, fifth generation ("5G") cellular service and the like, it is anticipated that network-connected electronic devices will be deployed at locations that lack a conventional electric power source with increasing frequency.

There are a number of ways to provide electric power to such remote network-connected electronic devices. For example, the local electric utility company may install a connection to the electric power grid. This approach, however, is typically both expensive and time-consuming, and unsuitable for many applications, especially when the number of connections to the electric power grid are on the order that is anticipated with the proliferation of outdoor small cells as part of the 5G deployment. Composite power-data cables can also be used to power remote network-connected electronic devices and provide data connectivity thereto over a single cabling connection. Composite power-data cables refer to cables that can transmit both electrical power and data. Power-over Ethernet ("PoE") cables are one type of composite power-data cable. However, PoE technology has limitations in terms of both data communication throughput and the amount of power delivered, and these limitations become more restrictive the greater the distance between the remote network-connected electronic device and the PoE source. For example, under current PoE standards, high throughput data communications is only supported for cable lengths of up to about 100 meters, and even at these short distances the power delivery capacity is only about 100 Watts. Power-plus fiber cables are another example of a type of composite power-data cable that includes both power conductors and optical fibers within a common cable jacket. Power-plus-fiber cables, however, can be prohibitively expensive to install for many applications. Other known types of composite power-data cables include coaxial cables, telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission.

The composite power-data cables may connect to multiple splice enclosures that route power signals to remote power devices (RPDs). Transmission of power to the RPDs needs to be provided in a manner to reduce power outages to RPDs.

BRIEF DESCRIPTION OF THE DRAWINGS

FIGS. 7-12 are flowcharts of operations for providing power from a power sourcing device to a plurality of splice enclosures, according to embodiments of the present inventive concepts.

DETAILED DESCRIPTION

Figure 1:
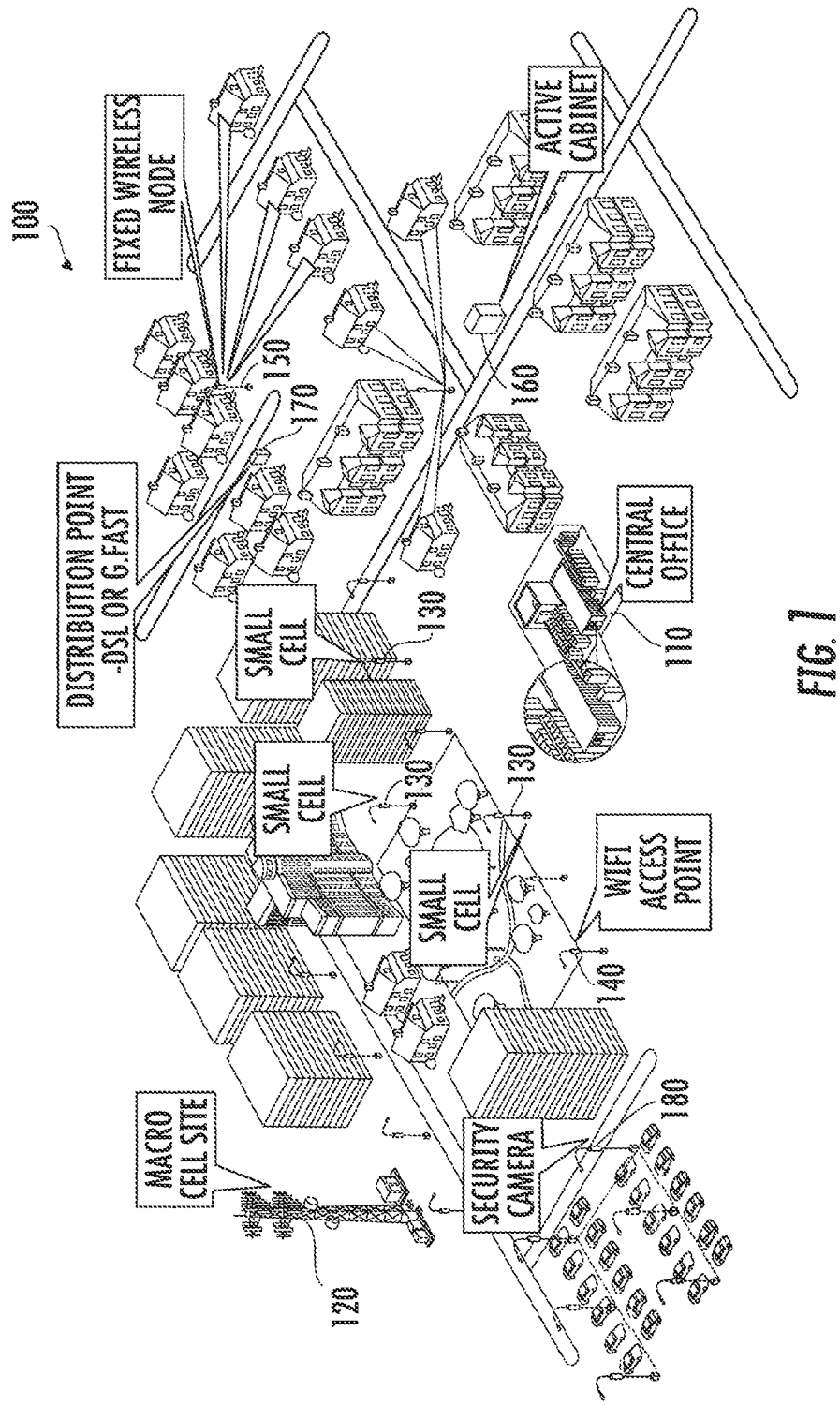
FIG. 1 is a schematic diagram illustrating the increasing power and data connectivity needs for information and communication technology infrastructure in high density access networks.

Cellular data traffic has increased by about 4,000 percent over the last decade, and is expected to continue increasing at a rate of over 50% per year for at least the next several years. Cellular operators are beginning to deploy 5G cellular networks in an effort to support the increased cellular data traffic with better coverage and reduced latency. One expected change in the cellular architecture that is anticipated with the roll-out of 5G networks is a rapid increase in the number of so-called small cell base stations that are deployed. Generally speaking, a "small cell" base station refers to an operator-controlled, low-power radio access node that operates in the licensed spectrum and/or that operates in the unlicensed spectrum but provides operator-grade WiFi connectivity. The term "small cell" encompasses microcells, picocells, femtocells and metrocells that support communications with fixed and mobile subscribers that are within between about 10 meters and 300-500 meters of the small cell base station depending on the type of small cell used. The term small cell generally does not encompass in-building solutions such as distributed antenna systems that are typically implemented as part of the macrocell layer of a cellular network.

Small cell base stations are typically deployed within the coverage area of a macrocell base station of the cellular network, and the small cell base stations are used to provide increased throughput in high traffic areas within the macrocell. This approach allows the macrocell base station to be used to provide coverage over a wide area, with the small cell base stations supporting much of the capacity requirements in high traffic areas within the macrocell. In heavily-populated urban and suburban areas, it is anticipated that more than ten small cells will be deployed within a typical 5G macrocell in order to support the increased throughput requirements. As small cell base stations have limited range, they must be located in close proximity to users, which typically requires that the small cell base stations be located outdoors, often on publicly-owned land such as along streets. Typical outdoor locations for small cell base stations include lamp posts, utility poles, street signs and the like, which are locations that either do not include an electric power source, or include a power source that is owned and operated by an entity other than the cellular network operator. A typical small cell base station may require between 200-2,000 Watts of power. As small cell base stations are deployed in large numbers, providing electric power to the small cell base station locations represents a significant challenge.

When deploying a new macrocell base station, a cellular operator will typically work with the local electric utility company to arrange to have alternating current ("AC") power provided to the site from the local electric power grid. While this process may be both time-consuming and expensive, the time required to plan, build and deploy a new macrocell base station may be as long as two years, allowing sufficient time for coordinating with the electric utility company, obtaining necessary permitting from local government agencies, and then having the local electric utility company deploy the connection to the electric power grid in order to deliver power to the site. Moreover, the cost associated with providing power to the macrocell base station, which may be on the order of $5,000 to $20,000, can readily be absorbed by a macrocell base station that serves thousands of users. Thus providing electric power to macrocell base stations has not raised major issues for cellular network operators. Unfortunately, however, the model for delivering electric power to macrocell base stations does not work well with small cell deployments, where the cellular network operator typically needs to deploy small cell base stations quickly, and based on the magnitude of anticipated small cells, powering each small cell base station from the alternating current ("AC") electric utility grid cannot be achieved in a cost-effective manner. In order to meet these goals, cellular operators require a repeatable process for delivering electric power to small cell base station locations that preferably does not require involvement of third parties such as electric utility companies.

One solution that has been proposed for powering small cell base stations is the use of the above-mentioned composite power-data cables. Composite power-data cables allow a cellular network operator to deploy a single cable between a hub and a small cell base station that provides both electric power and backhaul connectivity to the small cell base station. The hub may be, for example, a central office, a macro cell base station or some other network operator owned site that is connected to the electric power grid. All cellular base stations must have some sort of backhaul connection to the core network, and with small cell base stations the backhaul connection is typically implemented as a fiber optic cabling connection. Since the cellular network operator already would typically deploy a fiber optic cable to a new small cell base station installation, changing the fiber optic cable to a power-plus-fiber cable provides a relatively low cost solution for also providing an electric power connection to the new small cell base station, particularly as the installation costs associated with installing a new cabling connection between a hub and the new small cell base station will typically exceed, and often far exceed, the additional cost associated with adding power conductors to the fiber optic cable. For example, the incremental cost of deploying (installing) a power-plus-fiber cable as compared to deploying a fiber optic cable is less than $1/foot, while the cost of deploying cables in the outside plant are on the order of $1.5/foot to $6/foot in typical installations. Moreover, in urban areas—which is one of the most common locations where new small cell base stations are being deployed—the cables often must be installed underground beneath concrete or asphalt surfaces. In such environments, the installation costs can be as high as $30-40/foot or even more.

While using composite power-data cables may be an improvement over more conventional solutions for powering small cell base stations and other remote network-connected devices, deploying long composite power-data cables can be expensive and time-consuming, and hence may not be a completely satisfactory solution. As such, new techniques for providing backhaul and power connectivity to 5G small cell base stations and other remote network-connected device are needed.

Pursuant to embodiments of the present invention, power and data connectivity micro grids are provided for information and communication technology infrastructure including small cell base stations. These power and data connectivity micro grids may be owned and controlled by cellular network operators, which allows the cellular network operators to more quickly and less expensively provide power and data connectivity (backhaul) to new small cell base stations. The power and data connectivity micro grids according to embodiments of the present invention may be cost-effectively deployed by over-provisioning the power sourcing equipment and cables that are installed to provide power and data connectivity to new installations such as new small cell base station installations.

The power and data connectivity micro grids according to embodiments of the present invention may include a network of composite power-data cables that are used to distribute electric power and data connectivity throughout a defined region. These micro grids may be deployed in high density areas, which is where most 5G small cell base stations will need to be deployed. Each micro grid may include a network of composite power-data cables that extend throughout a geographic area. The network of composite power-data cables (and the sourcing equipment supplying the network of composite power-data cables with power and data capacity) may be designed to have power and data capacity far exceeding the capacity requirements of existing nodes along the micro grid. Because such excess capacity is provided, when new remote network-connected devices are installed in the vicinity of a micro grid, composite power-data cables can be routed from tap points along the micro grid to the location of the new remote network-connected device (e.g., a new small cell base station). The newly installed composite power-data cables may themselves be over-provisioned and additional tap points may be provided along the new composite power-data cabling connections so that each new installation may act to further extend the footprint of the micro grid. In this fashion, cellular network operators may incrementally establish their own power and data connectivity micro grids throughout high density areas, such that when new small cell base stations, WiFi access points or other remote powered devices are deployed, they will often be in close proximity to at least one tap point along the micro grid. In many cases, the only additional cabling that will be required to power such new base stations is a relatively short composite power-data cable that connects the new small cell base station to an existing tap point of the micro grid. Moreover, by over-provisioning some or all of the newly-installed composite power-data cables, the micro grids according to embodiments of the present invention may naturally grow throughout high density areas allowing network operators to quickly and inexpensively add new infrastructure to their networks. In some embodiments, the composite power-data cables may be implemented as power-plus-fiber cables, as such cables have significant power and data transmission capacity. However, other composite power-data cables (e.g., coaxial cables) may additionally and/or alternatively be used.

In some embodiments, the power delivery component of the power and data connectivity micro grids may comprise a low voltage, direct current ("DC") power grid. In some embodiments, the DC power signals that are distributed over the micro grid may have a voltage that is higher than the (AC) voltages used in most electric utility power distribution systems (e.g., 110 V or 220 V AC), which may help reduce power loss, but the voltage may be lower than 1500 V DC so as to qualify as a low voltage DC voltage under current standards promulgated by the International Electrotechnical Commission (IEC). For example, the micro grid may carry a 380 V DC power signal (or some other DC voltage greater than 48-60 V and less than 1500 V) in some embodiments. The 380 V DC power signal may comprise a +/−190 V DC power signal in some embodiments.

Tap points may be installed along the composite power-data cables. In some embodiments, the tap points may comprise intelligent remote distribution nodes that include a gated pass-through power bus that allows for daisy chain operation and/or splitting of the power signal, as well as one or more local ports that may be used to power remote powered devices that are co-located with the intelligent remote distribution node or in close proximity thereto. When a new composite power-data cable is installed, one or more unused intelligent remote distribution nodes may be pre-installed along the composite power-data cable to serve as tap points for information and communication infrastructure that is deployed in the future. In other embodiments, the tap points may comprise splice enclosures that are installed along the composite power-data cables. These splice enclosures may be similar to conventional fiber optic splice enclosures and may include terminations for both the optical fibers and power conductors of the composite power-data cables. The splice enclosures may provide connection points for "branch" composite power-data cables that supply power and data connectivity to existing installations that are connected to the micro grid, may include a gated pass-through power bus, and/or may act as tap points for future installations.

In some instances, multiple composite power-data cables may be deployed that run in parallel between power and data connectivity source equipment and splice enclosures and/or intelligent remote distribution nodes in order to pre-install additional power and data capacity that can be tapped into later to support future installations. In this fashion, power and data connectivity may be deployed to new installations while at the same time building out a highly over-provisioned micro grid of power and data connectivity resources that may be used to economically provide power and data connectivity to future installations. Such an approach has the potential to significantly reduce the costs of providing power and data connectivity to newly deployed equipment while also significantly reducing the time required to provide such power and data to a new installation. In still other embodiments, additional power sourcing equipment devices may be installed as the micro grid grows, and power and data may be fed to splice enclosures and/or intelligent remote distribution nodes from multiple power sourcing equipment devices. This may increase the number of remote powered devices that may be supported by the micro grid and may provide redundancy in the event of a fault at one of the power sourcing equipment devices. Moreover, as discussed herein, if power sourcing equipment devices are connected at both ends of a power-data cable, then even if a fault occurs along the power-data cable it may still be possible to power all of the remote powered devices along the power-data cable.

Multiple splice enclosures may be fed from a power sourcing device using a composite power-data cable. Each of these multiple splice enclosures may route power to one or more remote powered devices. A need may arise to disable power to one of the splice enclosures to perform maintenance, or due to a fault occurring in a portion of the composite power-data cable. Various embodiment described herein may arise from the recognition for a need to disable power to a single splice enclosure without disrupting power to other splice enclosures, either due to a localized fault in the composite power-data cable or for performing maintenance activities on the single splice enclosure. Splice enclosures may include terminations for both the optical fibers and power conductors of the composite power-data cables. The splice enclosures may provide connection points for "branch" composite power-data cables that supply power and data connectivity to existing installations that are connected to the micro grid, may include a gated pass-through power bus, and/or may act as tap points for future installations. Since splice enclosures are commonly used in power and data connectivity micro grids, they are familiar to outside plant (OSP) environment technicians and linemen. These splice enclosures provide an accessible location to add power splices and provide a control point since they are typically deployed at small cell pole locations.

Aspects of the present invention will now be discussed in greater detail with reference to the figures, which illustrate example embodiments of the power and data connectivity micro grids according to embodiments of the present invention.

FIG. 1 is a schematic diagram illustrating the increasing power and data connectivity needs for information and communication technology infrastructure in high density access networks. As shown in FIG. 1, in an urban or suburban environment 100, a telecommunications provider such as a cellular network operator may operate a central office 110 and a macro cell base station 120. In addition, the telecommunications provider may operate a plurality of small cell base stations 130, WiFi access points 140, fixed wireless nodes 150, active cabinets 160, DSL distribution points 170, security cameras 180 and the like. All of these installations may require DC power to operate active equipment, and most, if not all, of these installations may also require data connectivity either for backhaul connections to the central office and/or for control or monitoring purposes. Since most electronics used in the telecommunications industry are powered using DC power, power grids that deliver DC power to the electronic equipment may provide a more efficient and reliable network, as DC-to-DC power conversions are typically more energy efficient than AC-to-DC and/or DC-to-AC conversions and because delivering DC power to the end devices may reduce the total number of power conversions required. As described above, it may be both expensive and time consuming to provide local power sources for these installations.

In order to reduce costs and increase the speed at which electric power and data connectivity can be deployed to remote network-connected powered devices such as the remote devices 130, 140, 150, 160, 170, 180 illustrated in FIG. 1, the use of power-plus-fiber cables has been proposed as a cost-effective solution for providing power and data connectivity to remote devices. For example, PCT Publication No. WO 2018/017544 A1, incorporated herein by reference, discloses an approach for providing power and data connectivity to a series of remote powered devices in which power-plus-fiber cables extend from a power source to a plurality of intelligent remote distribution nodes. Each intelligent remote distribution node may include a "pass-through" port so that a plurality of remote distribution nodes may be coupled to the power source in "daisy chain" fashion. Intelligent remote powered devices may be connected to each intelligent remote distribution node and may receive power and data connectivity from the intelligent remote distribution node.

Figure 2:
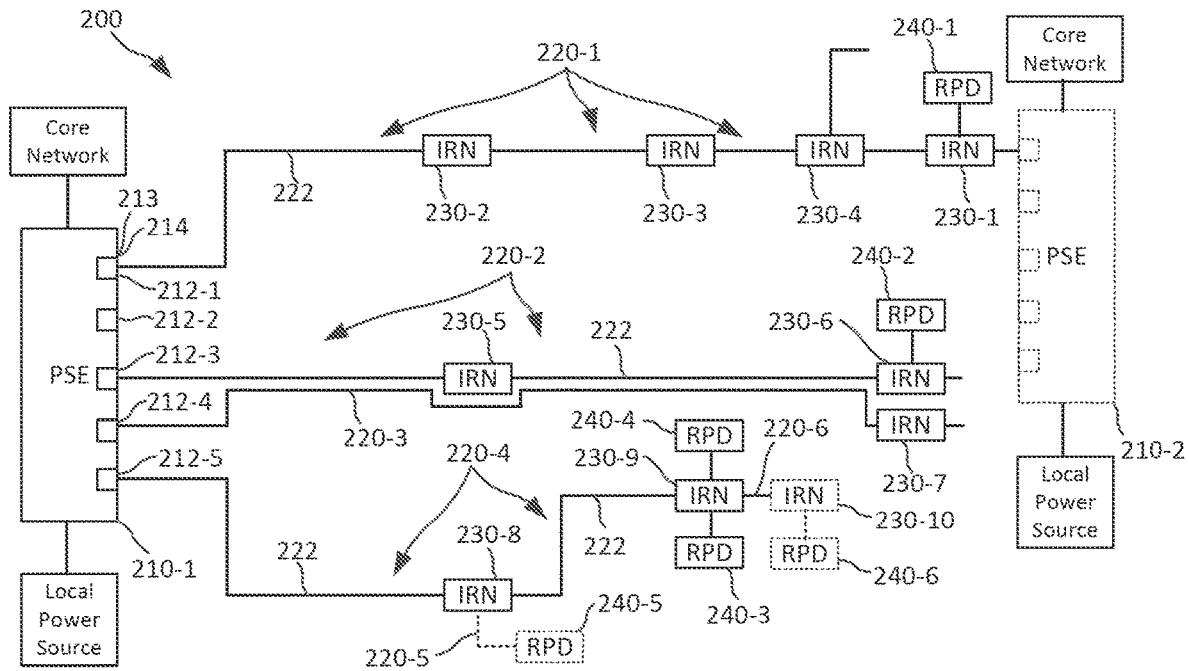
FIGS. 2 and 3 are schematic diagrams illustrating power and data connectivity micro grids according to embodiments of the present inventive concepts.

FIG. 2 is a schematic diagram illustrating a power and data connectivity micro grid 200 according to embodiments of the present invention. As shown in FIG. 2, a power sourcing equipment ("PSE") device 210-1, which may be referred to herein as a power sourcing device, may be provided that acts as an injection point for both power and data into the power and data connectivity micro grid 200. Each of the power sourcing equipment devices 210-1, 210-2 may include a plurality of power ports 213 and data ports 214. The power ports 213 and the data ports 214 will typically be implemented as power and data connectors, respectively, but other implementations are possible. For example, the power ports 213 and/or the data ports 214 could be implemented as openings in a housing of the power sourcing equipment device 210 that are configured to receive the power and/or data cables 213, 214. In some embodiments, a power port 213 and a data port 214 may be implemented together as a hybrid power-data port 212 that includes one or more power ports 213 and one or more data ports 214 that are implemented using, for example, a single hybrid connector. In other embodiments, the power ports 213 and the data ports 214 may be implemented separately (e.g., as separate connectors). In the description that follows, it will be assumed that the power ports 213 and the data ports 214 are implemented using hybrid power-data ports 212 for convenience, but it will be appreciated that any or all of the hybrid power-data ports 212 may be replaced with separate power ports 213 and the data ports 214 in other embodiments. Accordingly, it will be understood that herein all references to hybrid power-data ports may be replaced with references to separate power and data ports. Moreover, in some cases the data ports may be omitted.

Composite power-data cables 220 may be connected to each hybrid power-data port 212 to extend the micro grid 200 across a geographic region. Each composite power-data cable 220 may comprise, for example, a single cable that includes both power conductors and optical fibers, one or more power cables and one or more fiber optic cables that are contained together within a common jacket, one or more power cables and one or more fiber optic cables that are coupled together (e.g., by a helical wrap) or any other cable or combination of cables that include both power conductors and a data transmission medium that may be used to carry both DC power as well as data. Coaxial cables are another type of composite power-data cable 220 that can be used in some embodiments of the present invention. Additional composite power-data cables include telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission. The composite power-data cables 220 will typically be connectorized. In some embodiments, ends of the composite power-data cables 220 may include fanouts of electrical conductors and optical fibers (which may comprise single conductors/fibers or groups thereof) that are individually connectorized. In other embodiments, the composite power-data cables 220 may be connectorized using one or more hybrid power-data connectors. When coaxial cables, Ethernet cable and the like are used to implement the composite power-data cables, the same conductors carry both the power and data signals and suitable mechanisms may be used to inject and extract the data communication signals. Each composite power-data cable 220 may include control wires for communication between the power sourcing device and one or more splice enclosures 250. Each composite power-data cable 220 may include continuity wires that are used to sense if the cable is cut so that the electric power that is provided to the power conductors of the cable may be shut off in response to sensing such a cut to the cable.

Initially, only a single power sourcing equipment device 210-1 may be provided, and then additional power sourcing equipment devices 210 may be added as the micro grid 200 is expanded. One such additional power sourcing equipment device 210-2 is shown with dotted lines in FIG. 2. Each power sourcing equipment device 210 may be configured to output DC power through each hybrid power-data port 212 and to transmit and receive data through each hybrid power-data port 212. It should be noted that like elements may be designated with the same reference numeral in this specification and in the accompanying drawings. In some case, such like elements may be assigned two part reference numerals so that the elements may be referred to individually by their full reference numerals (e.g., power sourcing equipment device 210-2) or referred to collectively by the first part of their reference numeral (e.g., the power sourcing equipment devices 210).

A plurality of composite power-data cables 220 are connected to the respective hybrid power-data ports 212 of the power sourcing equipment device 210. As noted above, the composite power-data cables 220 may be implemented using power-plus-fiber cables in some embodiments. For ease of description, in the discussion that follows, the composite power-data cables 220 will be described as being power-plus-fiber cables 220. It will be appreciated, however, that other types of composite power-data cables 220 may be used and that appropriate modifications may be made to the equipment attached to the cables.

Referring again to FIG. 2, each power-plus-fiber cable 220 may include a plurality of discrete cable segments 222. Each cable segment 222 may be connectorized with, for example, a fanout of individual power connectors and data connectors or with one or more hybrid power-data connectors. Each cable segment 222 may include a plurality of optical fibers and at least a pair of electrical conductors (e.g., 12 AWG or 16 AWG copper conductors). While typically both the optical fibers and the power conductors will be contained within a common protective jacket, in some embodiments, the power-plus-fiber cables 220 may be implemented as separate fiber optic and power cable that are co-installed with each other (e.g., routed through the same conduit).

As is further shown in FIG. 2, a plurality of intelligent remote distribution nodes ("IRN") 230 may be installed along each power-plus-fiber cable 220. Remote powered devices ("RPD") 240 such as small cell base stations, WiFi access points, fixed wireless nodes, active cabinets, DSL distribution points, security cameras and the like may be connected to respective ones of the intelligent remote distribution nodes 230. In some cases, a single remote powered device 240 may be connected to an intelligent remote distribution node 230, while in other cases multiple remote powered devices 240 may be connected to the same intelligent remote distribution node 230.

When a new remote powered device 240 is being added to the network, the network operator may install a power-plus-fiber cable 220 that connects the new remote powered device 240 to a hybrid power-data port 212 on the power sourcing equipment device 210. For example, with reference to FIG. 2, the new remote powered device 240 may be the remote powered device 240-1. As shown in FIG. 2, a power-plus-fiber cable 220-1 may be installed that connects hybrid power-data port 212-1 on power sourcing equipment device 210-1 to an intelligent remote distribution node 230-1. The power-plus-fiber cable 220-1 may be purposefully over-provisioned to include excess power and data carrying capacity. For example, the power-plus-fiber cable 220-1 may include twelve, twenty-four, forty-eight or more optical fibers even though the new remote powered device 240-1 may only require one or two optical fibers for data connectivity. Likewise, the power-plus-fiber cable 220-1 may include a plurality of pairs of power conductors that are capable of transmitting significantly more power than is required by the new remote powered device 240-1. In addition, one or more additional intelligent remote distribution nodes 230-2, 230-3, 230-4 may be pre-installed along the power-plus-fiber cable 220-1, thereby dividing the power-plus-fiber cable 220-1 into a plurality of cable segments 222. The intelligent remote distribution nodes 230-2, 230-3, 230-4 may serve as tap points where additional power-plus-fiber cables 220 may be added to the micro grid 200 to provide power and data connectivity to other installations in the future.

As is further shown in FIG. 2, when another remote powered device 240-2 is added to the network, a pair of power-plus-fiber cables 220-2, 220-3 may be co-installed at the same time. Power-plus-fiber cable 220-2 may extend between another hybrid power-data port 212-3 on power sourcing equipment device 210-1 to an intelligent remote distribution node 230-6. The power-plus-fiber cable 220-2 may again be purposefully over-provisioned to include excess power and data carrying capacity, and may also have one or more additional intelligent remote distribution nodes (here node 230-5) pre-installed as a future tap point between the hybrid power-data port 212-3 and the intelligent remote distribution node 230-6. In addition, a second power-plus-fiber cable 220-3 may be installed at the same time as power-plus-fiber cable 220-2, even though the second power-plus-fiber cable 220-3 is not needed to support the remote powered device 240-2. Power-plus-fiber cables 220-2, 220-3 may be installed directly next to each other in, for example, the underground and/or aerial outside plant so that the incremental installation cost for deploying the additional power-plus-fiber cable 220-3 may be kept low. The additional power-plus-fiber cable 220-3 may have an intelligent remote distribution node 230-7 installed at the distal end thereof that may serve as a tap point for future additional power-plus-fiber cables 220. The intelligent remote distribution node 230-7 may be at a relatively large distance from the power sourcing equipment device 210. By pre-installing power-plus-fiber cable 220-3 at the time power-plus-fiber cable 220-2 is deployed, the need to later install power-plus-fiber cables 220 that extend all the way back to the power sourcing equipment device 210-1 may be avoided, because when new remote powered devices 240 are installed in the general vicinity of the remote powered device 240-2, the pre-installed power-plus-fiber cable 220-3 may be used to provide power and data connectivity to such newly-installed devices 240 through short power-plus-fiber connections to the intelligent remote distribution node 230-7.

As will be discussed in greater detail herein, each pre-installed intelligent remote distribution node 230 may have low voltage and/or high voltage ports. As noted above, the power sourcing equipment device 210 may output a low voltage DC power signals (e.g., 380 V or some other voltage less than 1500 V DC) onto the power-plus-fiber cables 220. Since the low voltage DC power signal may be significantly higher than the DC voltages (e.g., 46-60 V DC) used to power most information and telecommunications infrastructure equipment, the power loss along the power-plus-fiber cables 220 may be reduced and/or the power carrying capacity of the hybrid power-plus-fiber cables 220 may be increased. As will be explained in greater detail below, each intelligent remote distribution node 230 may include a pass-through power bus that passes DC power that is received over a first power-plus-fiber cable segment 222 at an input port of the intelligent remote distribution node 230 to a second power-plus-fiber cable segment 222 that is connected to an output port of the intelligent remote distribution node 230. Each intelligent remote distribution node 230 may further include a local power bus that taps a portion of the DC power signal from the pass-through power bus. Each intelligent remote distribution node 230 may also include step-down equipment such as a buck converter that reduces the voltage level of the tapped DC power signal to a level that is suitable for powering the remote powered devices 240 (e.g., 48-64 V DC). The pass-through power bus may facilitate "daisy-chaining" multiple intelligent remote distribution nodes 230 along a single power-plus-fiber cable 220 to support remote powered devices 240 at a plurality of locations. By providing intelligent remote distribution nodes 230 that have pass through power buses with multiple outputs, new branches may be deployed from an existing intelligent remote distribution node 230 that extend in new directions to power remote powered devices 240.

Once the micro grid 200 has been partially deployed, the expense associated with adding additional remote powered devices 240 may be reduced. For example, as shown in FIG. 2, the cellular network operator may initially install a power-plus-fiber cable 220-4 that is used to power a pair of remote powered devices 240-3, 240-4 via the local ports of an intelligent remote distribution node 230-9. When the power-plus-fiber cable 220-4 and the intelligent remote distribution node 230-9 were installed, the power-plus-fiber cable 220-4 was over-provisioned with significant excess power and data-carrying capacity, and an unused intelligent remote distribution node 230-8 was installed along the power-plus-fiber cable 240-4 between the power sourcing equipment device 210-1 and the intelligent remote distribution node 230-9. Thereafter, the cellular network operator may need to install additional remote powered devices 240 such as remote powered device 240-5 and/or remote powered device 240-6. A power-plus-fiber cable 220-5 (or other composite power-data cable) may be installed between the remoted powered device 240-5 and the intelligent remote distribution node 230-8 to provide power and data connectivity to the remote powered device 240-5. In many cases, the remote powered device 240-5 may be much closer to the intelligent remote distribution node 230-8 than it is to the power sourcing equipment device 210-1. As such, significant savings may be achieved since the cellular network operator can install a relatively short power-plus-fiber cable 220-5 to connect the remote powered device 240-5 to the micro grid 200. Remote powered device 240-6 may similarly be connected to the micro grid 200 by installing another intelligent remote distribution node 230-10 and connecting a power-plus-fiber cable 220-6 between intelligent remote distribution nodes 230-9 and 230-10. The installation of intelligent remote distribution node 230-10 also advantageously serves to further expand the power and data connectivity micro grid 200 throughout the geographic region, which may help further reduce the cost of installing additional remote powered devices 240 in the future.

As is further shown in FIG. 2, additional power sourcing equipment devices 210 such as power sourcing equipment device 210-2 may be added to the micro grid 200 over time. In some embodiments, the power sourcing equipment devices 210-1, 210-2 may be located in geographically diverse locations to reduce power losses over the power-plus-fiber cabling connections 220. In addition, the second power sourcing equipment device 210-2 may be connected to some of the same intelligent remote distribution nodes 230 as is power sourcing equipment device 210-1. As a result, the remote powered devices 240 along such power-plus-fiber cables 220 may be powered by either power sourcing equipment device 210. This arrangement provides redundancy in case there is a failure at one of the power sourcing equipment devices 210 and/or one of the power-plus-fiber cables 220 is damaged.

Figure 3:
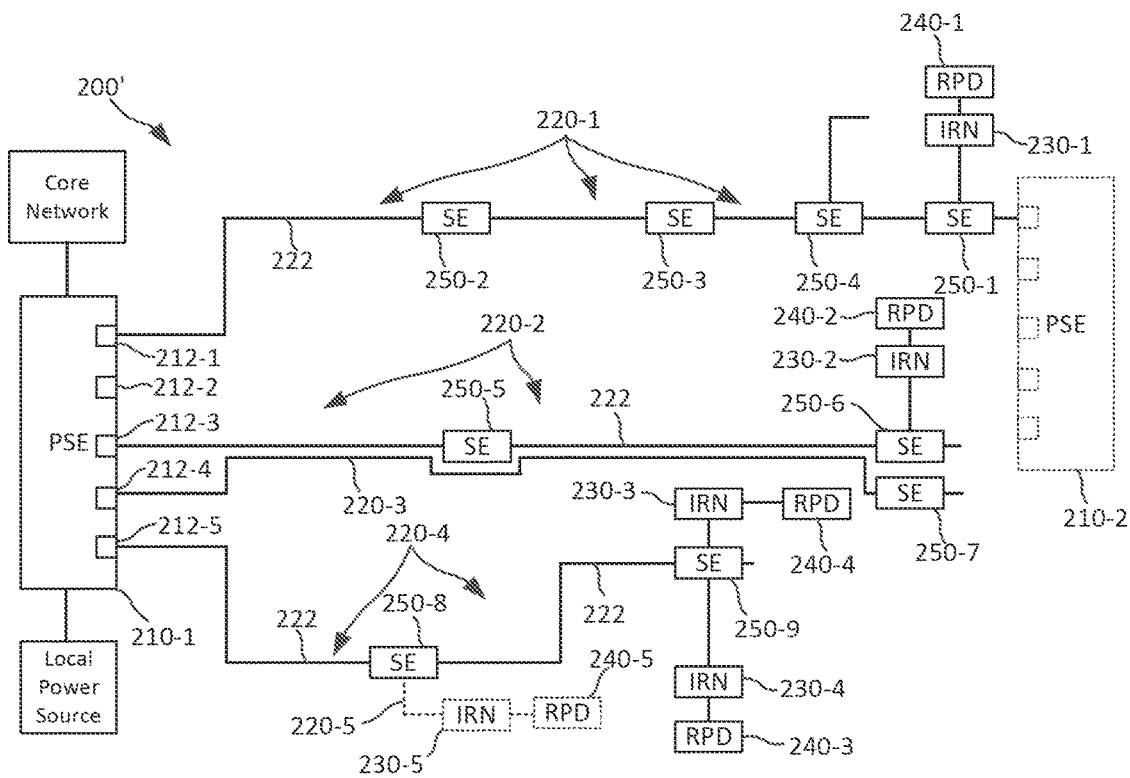

FIG. 3 is a schematic diagram illustrating a power and data connectivity micro grid 200' according to further embodiments of the present invention. As can be seen by comparing FIGS. 2 and 3, the power and data connectivity micro grid 200' is similar to the above-described power and data connectivity micro grid 200, except that the power and data connectivity micro grid 200' includes a plurality of splice enclosures 250. The splice enclosures 250 may be installed at the locations where intelligent remote distribution node 230 are deployed in the power and data connectivity micro grid 200 of FIG. 2. The splice enclosures 250 may comprise hardened enclosures that include splice trays for both power conductors and for optical fibers. The splice enclosures 250 may be installed, for example, either underground or in the aerial outdoor plant. Each splice enclosure 250 may further include a connectorized power input port and a connectorized data input port that are configured to receive a power-plus-fiber cable 220. The connectorized power input port and a connectorized data input port may be implemented as separate connectorized power and data ports or as a hybrid power-data connector. Each splice enclosure 250 may also include one or more connectorized power output ports and one or more connectorized data output ports (which can be implemented as separate power and data ports or as hybrid power-data ports) that are configured to receive respective power-plus-fiber cables 220. In other embodiments, the ports on the splice enclosures 250 may not be connectorized. One pair of a power output port and a data output port may be viewed as a "pass-through" ports and the remaining pairs of power and data output ports may be viewed as "tap" ports that may be used to provide power and data connectivity to individual remote network-connected devices (or co-located groups thereof), although embodiments of the present invention are not limited thereto (e.g., a splice enclosure may have multiple pass-through ports). When a new remote powered device 240-5 such as a small cell base station is to be deployed, an intelligent remote distribution node 230-5 may be installed at the site for the new small cell base station 240-5 (e.g., on a utility pole where the small cell radio 240-5 and antenna are mounted).

A power-plus-fiber cable 220-5 may then be deployed between the newly-installed intelligent remote distribution node 230-5 and the closest splice enclosure 250-8 of the power and data connectivity micro grid 200', and a short jumper cable (or cables) may connect the intelligent remote distribution node 230-5 to the small cell radio 240-5. The splice enclosure 250-8 may be designed to output high voltage DC power signals (e.g., 380 V DC) to each output port thereof. The intelligent remote distribution nodes 230-5 may include step-down equipment such as a buck converter that reduces the voltage level of the DC power signal delivered thereto from the splice enclosure 250-8 to a level that is suitable for powering the remote powered devices 240-5 (e.g., 48-64 V DC). The intelligent remote distribution nodes 230-5 may or may not include pass-through power buses that allow daisy-chaining multiple intelligent remote distribution nodes 230-5 together. The intelligent remote node 230 may also be collocated with a remote powered device 240.

To supply data connectivity to the newly-installed small cell base station 240-5, one or more of the optical fibers of power-plus-fiber cable 220-4 may be spliced in the splice enclosure 250-8 to connect to a data tap port of the splice enclosure 250-8. The data tap port of splice enclosure 250-8 may be connected to a data input port on an intelligent remote distribution node 230-5 via, for example a power-plus-fiber cable 220-5 (as shown) or by a separate optical jumper cable. Electrical and optical paths in the intelligent remote distribution node 230-5 may connect the power conductors and optical fibers of power-plus-fiber cable 220-5 to a local power port and a local data port, respectively, of the intelligent remote distribution node 230-5. The local power and data ports of the intelligent remote distribution node 230-5 are connected to the small cell base station 240-5 via, for example, separate power and optical jumper cables. In this fashion, the splice enclosure 250-8 and the intelligent remote distribution node 230-5 may provide power and data connectivity to the small cell base station 240-5.

The architecture of power and data connectivity micro grid 200' may be advantageous because the splice enclosures 250 may be relatively inexpensive since they may include significantly less technology than an intelligent remote distribution node 230, and hence a plurality of splice enclosures 250 may be installed along a power-plus-fiber cable 220 at relatively low cost. The splice enclosures 250 may provide a plurality of tap points along each power-plus-fiber cable 220 providing numerous locations where the cellular network operator may tap into the micro grid 200' to provide power and data connectivity for future installations.

While the discussion above of FIGS. 2 and 3 describes embodiments where an optical fiber data connection is provided to each remote powered device 240, it will be appreciated that embodiments of the present invention are not limited thereto. For example, in some cases, Power over Ethernet ("PoE") cables (or coaxial cables) may be used to provide power and data from an intelligent remote distribution node 230 to a remote powered device 240. PoE cables may be particularly useful in situations where the intelligent remote distribution nodes 230 are installed in close proximity to relatively low power remote powered devices 240. A security camera is a good example of a remote powered device 240 that would typically be powered via a PoE cable rather than a power-plus fiber cable, so long as the security camera was close enough to the intelligent remote distribution node 230 that PoE power delivery could be used. Additionally, while the description above assumes that the composite power-data cables 220 are implemented as power-plus-fiber cables, it will be appreciated that other types of composite power-data cables 220, such as coaxial cables, may be used in other embodiments.

Figure 4:
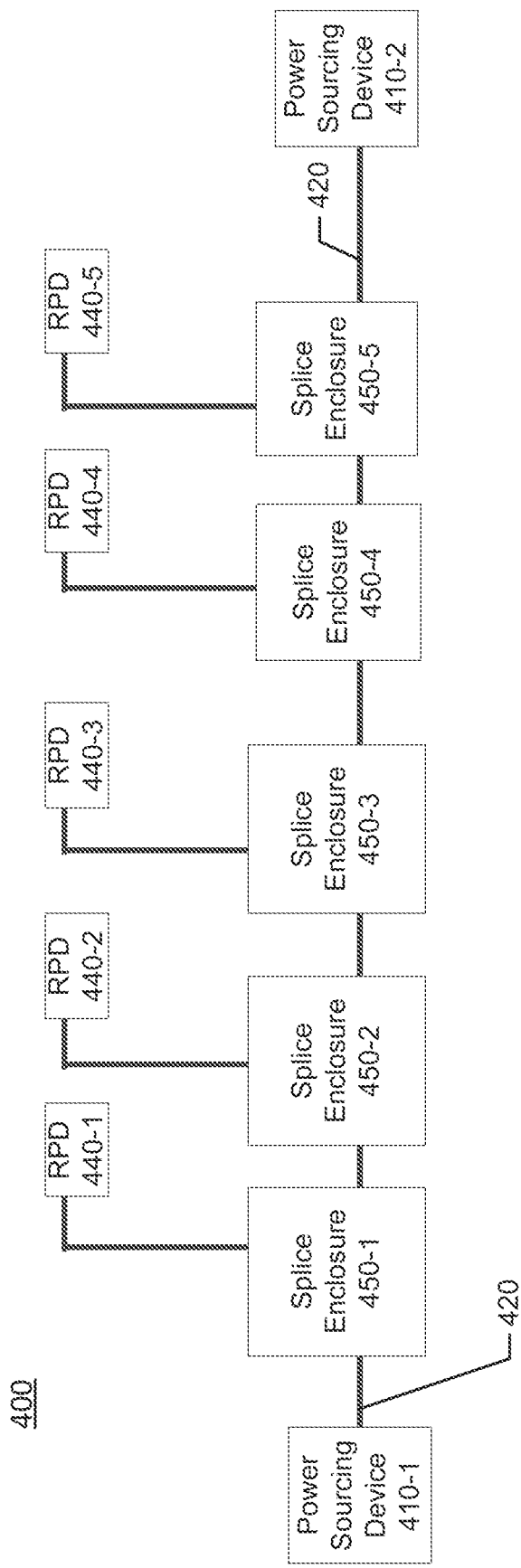
FIGS. 4, 5A, and 5B are schematic block diagrams illustrating power distribution in power and data connectivity micro grids according to embodiments of the present inventive concepts.

FIG. 4 is a schematic block diagram illustrating power distribution in a power system 400 using the power sourcing devices 210 of FIGS. 2 and 3. As shown in FIG. 4, the power sourcing device 410 may comprise one or more transformers, converters and/or power conditioners that convert AC or DC supplied power received from a local power source into DC power that is provided to splice enclosures 450-1, 450-2, 450-3, 450-4, 450-5. In some cases, the power sourcing device 410 may be located at a central office or other data distribution node of the cellular operator where a connection is available to a core network. In other cases, the power sourcing device 410 may be located closer to the micro grid and connected to the core network via, for example, fiber optic cabling connections. Power from a public utility may be available at the location of the power sourcing device 410.

The power sourcing device 410 delivers power to the remote power devices 440 through a composite power-data cable 420 that is connected to splice enclosures 450. Splice enclosures 450-1, 450-2, 450-3, 450-4, 450-5 may each receive power through the composite power-data cable 420 from power sourcing device 410-1 and/or from power sourcing device 410-2 and deliver power to remote powered devices 440-1, 440-2, 440-3, 440-4, 440-5.

Figure 5A:
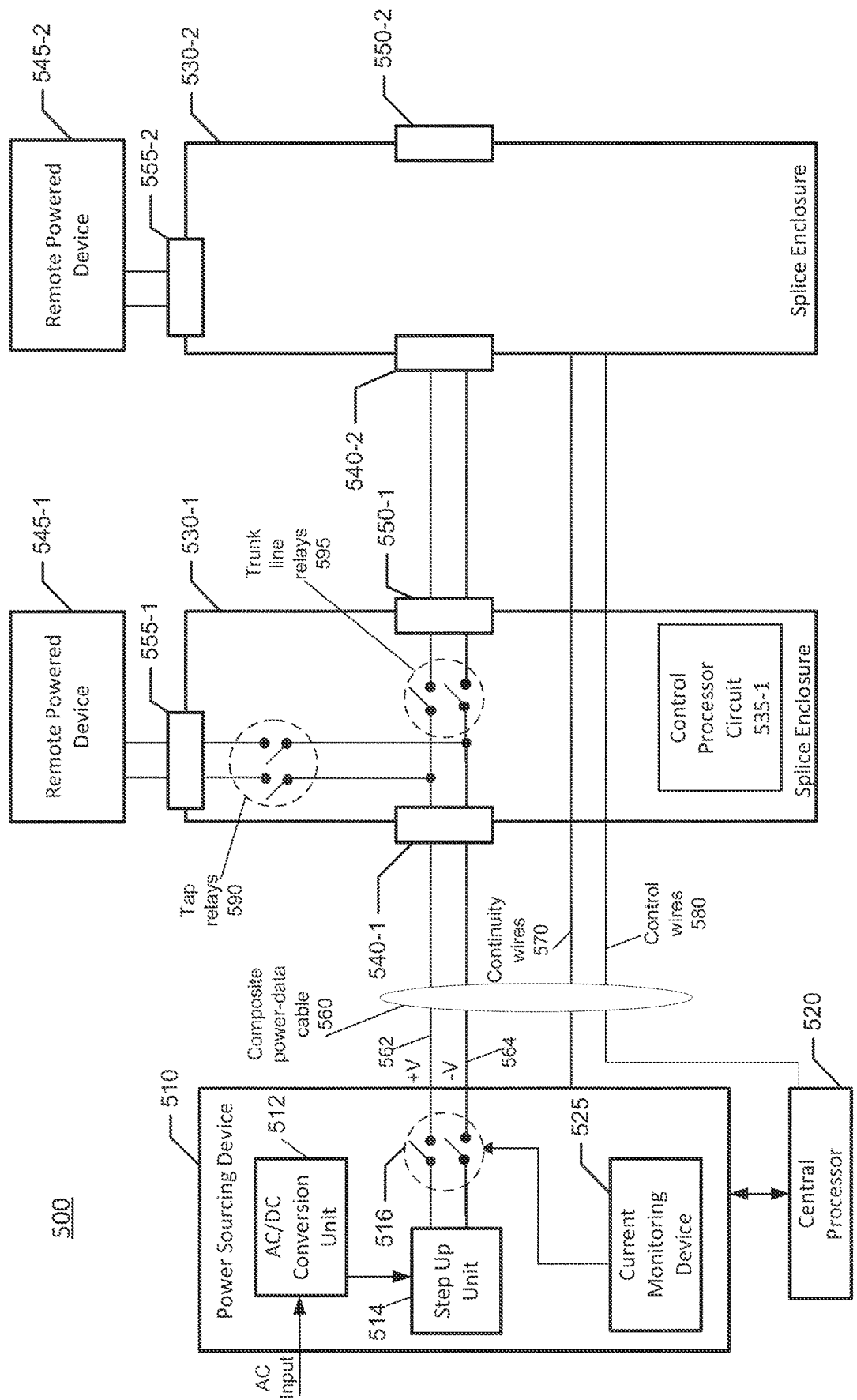

FIG. 5A is a schematic block diagram of power distribution in a power system 500 that may be used in the power and data connectivity micro grids according to embodiments of the present invention. For example, FIG. 5A provides further details regarding the power system 400 discussed with reference to FIG. 4.

Referring to FIG. 5A, the power sourcing device 510 may receive an AC input that is converted to a DC power signal by an AC/DC conversion unit 512. The AC/DC conversion unit 512 may transmit the DC power signal to a step up unit 514 to increase the voltage level of the DC power signal. The power sourcing device 510 may provide a DC power signal on power wires 562, 564 of the composite power-data cable 560 that includes a positive voltage on power wire 562 and a negative voltage on power wire 564. For example, the power wires 562, 564 may carry a 380 V DC power signal (or some other DC voltage greater than 48-60 V and less than 1500 V) in some embodiments. The 380 V DC power signal may comprise +/−190 V DC power signals on power wires 562, 564 of the composite power-data cable 560 in some embodiments. The power wires 562, 564 comprise power conductors (or groups of power conductors) that are rated to carry the power signals of power system 500. The power wires 562, 564 of the composite power-data cable 560 are connected to a splice enclosure 530. The power sourcing device 510 may include a current monitoring device 525 that detects a current change on the composite power-data cable 560 at the splice enclosure 530. Although the current monitoring device 525 is illustrated in FIG. 5A as being part of the power sourcing device 510, it may be located external to the power sourcing device 510 or may be co-located with the splice enclosure 530. The current monitoring device 525 may control power relays 516 that are deactivated (i.e., opened) if the current monitoring device 525 determines an unacceptable current change in the power wires 562, 564 and/or a fault on the composite power-data cable 560. Deactivating the power relays 516 blocks the DC power signals from power wires 562, 564. If the current monitoring device 525 does not indicate any faults or unacceptable current changes, then the power relays 516 are activated to allow the DC power signals to be coupled to the power wires 562, 564. The power relays 516 may include a latching relay in series with power wires 562, 564 of the composite power-data cable 560 and in parallel with current monitoring device 525 so that if either of power wires 562 or 564 incurs a fault, the system is able to safely shutdown. In some embodiments, the power relays 516 may be integrated with current monitoring device 525. Each of the power relays 516 may be connected to a respective resistor to ground to provide a current path when the power relays 516 are deactivated. In some embodiments, current monitoring devices may be provided at both the power sourcing devices 510 and at one or more of the splice enclosures 530 (and/or at intelligent remote distribution nodes 230).

The splice enclosure 530 may include an input port 540 and an output port 550. The input port 540 and the output port 550 may be implemented as hybrid power-data ports or as individual power and data ports. The remote powered device 545 may be configured to receive power and/or data from an external source (e.g., from a power sourcing device 510 through a splice enclosure 530 via a composite power-data cable 560). Splice enclosure 530-1 includes input port 540-1, output port 550-1, and tap port 555-1 that is coupled to remote powered device 545-1. Splice enclosure 530-2 includes input port 540-2, output port 550-2, and tap port 555-2 that is coupled to remote powered device 545-2. It will be appreciated that more than one input port 540, output port 550, and/or tap port 555 may be provided at each splice enclosure 530.

The power sourcing device 510 is configured to disable the power signals to at least one of the power input port 540-1, the power output port 550-1, or the power tap port 555-1 of the splice enclosure 530-1 without disabling the power signals at the second splice enclosure 530-2. The power sourcing device 510 may use the current monitoring device 525 to detect a current change on the composite power-data cable 560 at the splice enclosure 530-1. The power signals to the power input port 540-1 of splice enclosure 530-1 are disabled by the power sourcing device 510 when the current change on the composite power-data cable 560 at the splice enclosure 530-1 exceeds a threshold.

The input port 540-1 of splice enclosure 530-1 is coupled to power wires 562, 564 of the composite power-data cable 560. The splice enclosure 530-1 may include one or more relays such as trunk line relays 595 and/or tap relays 590 that are coupled to the input port 540-1. Relays may include semiconductor switches, electrical, electromagnetic, mechanical or electromechanical relays, latches, and/or other types of switches. Trunk line relays 595 may be coupled to output port 550-1. The tap relays 590 are configured to selectively supply power through tap port 555-1 to the remote powered device 545-1. When the tap relays 590 are activated (i.e., "on" or "closed"), the power signals received at input port 540-1 from power wires 562, 564 of the composite power-data cable 560 are transmitted to the remote powered device 545-1. When the tap relays 590 are deactivated (i.e., "off" or "open"), the power signals received at input port 540-1 from power wires 562, 564 of the composite power-data cable 560 are not transmitted to the remote powered device 545-1. Thus, in this case, the remote powered device 545-1 is not powered. Maintenance may be safely performed by a technician on the remote powered device 545-1 or on the portion of the splice enclosure 530-1 downstream from the connection between the input port 540-1 and tap relays 590. The tap relays 590 thus selectively enable power to the remote powered device 545-1.

The trunk line relays 595 are configured to selectively supply power signals to portions of the splice enclosure 530-1 and/or connect the power signals to the output port 550-1. When the trunk line relays 595 are activated (i.e., "on" or "closed"), the power signals received at input port 540-1 from power wires 562, 564 of the composite power-data cable 560 are transmitted to the output port 550-1 and/or to other circuitry of the splice enclosure 530-1. When the trunk line relays 595 are deactivated (i.e., "off" or "open"), the power signals received at input port 540-1 from power wires 562, 564 of the composite power-data cable 560 are not transmitted to the output port 550-1. Furthermore, power signals are not received from splice enclosure 530-2 that is downstream from splice enclosure 530-1.

The splice enclosure 530-1 may include a control processor circuit 535-1 that communicates with central processor 520 through control wires 580 of the composite power-data cable 560. The central processor 520 may be incorporated into the power sourcing device 510 or co-located with the power sourcing device 510 and/or in communication with power sourcing device 510. Central processor 520 is configured to control the power distribution in power system 500 by controlling the activity of the tap relays 590 and the trunk line relays 595. Central processor 520 may further determine the location of faults in the power system 500 and/or receive input from an operator or a technician regarding performing maintenance at splice enclosures 530, remote powered devices 545, and/or on segments of the composite power-data cable 560. Central processor 520 may then determine which relays such as tap relays 590 or trunk line relays 595 should be activated or deactivated for the given scenario.

The composite power-data cable 560 may include continuity wires 570 that carry communication and/or control signals that are used to sense when the cable is cut so that the electric power that is provided to the power wires 562, 564 of the cable may be shut off in response to sensing such a cut to the cable. U.S. Provisional Patent Application Ser. No. 63/026,291, filed May 18, 2020 ("the '291 application"), discloses examples of such composite power-data cables 562. The entire disclosure of the '291 application is incorporated herein by reference as if set forth in its entirety. The composite power-data cable 560 may include control wires 580 for communication between the power sourcing device 510 and one or more splice enclosures 530. The continuity wires 570 are arranged such that the cut in the composite power-data cable 560 may be sensed before the power wires 562, 564 are cut regardless of the orientation of the composite power-data cable 560. The control wires 580 are spaced apart from one another in a cross-sectional view of the composite power-data cable 560. The continuity wires 570 are spaced apart from one another in the cross-sectional view of the composite power-data cable 560. The continuity wires 570 alternate with ones of the control wires 580 in the cross-sectional view of the composite power-data cable 560. The continuity wires 570 are arranged to provide electrical conductivity sensing in various segments of the composite power-data cable 560.

In some embodiments, continuity wires 570 and control wires 580 together provide a continuity function. For example, two continuity wires 570 and two control wires 580 (i.e., four wires) may provide continuity information for the composite power-data cable 560. When the composite power-data cable 560 is connected, the continuity wires 570 may be connected in loops to splice enclosure 530-1 such that the continuity and control wires 570, 580 are disposed as pairs where two of the continuity wires 570 are arranged as a first pair forming a first loop with a DC signal thereon and two of the control wires 580 are arranged as a second pair forming a second loop with a DC signal thereon. If any of these four wires are cut or lose signal continuity, a monitoring device at either power sourcing device 510 or splice enclosure 530-1 detects the loss of continuity in the any of the continuity wires 570 or the control wires 580. A loss of continuity (i.e., a significant current change) of the DC signals in at least one of the continuity wires 570 or the control wires 580 may be detected, for example, by a current sensor in an Insulation Monitoring Device (IMD) in the power sourcing device 510. Upon sensing a loss of continuity, the IMD may send a control signal to splice enclosure 530-1 to deactivate trunk line relays 595 and/or tap relays 590. If the IMD in the power sourcing device 510 is unable to detect a loss of continuity, a current monitoring device at splice enclosure 530-1 may detect the loss of continuity and take appropriate actions to deactivate one or more of the trunk line relays 595 and/or tap relays 590.

Power signals on the composite power-data cable 560 are disabled to at least one of the power input port 540-1, the power output port 550-1, or the power tap port 555-1 of the splice enclosure 530-1 based on control signals sent by the central processor 520 on the control wires 580 to splice enclosure 530-1. For example, a fault in the continuity wires 570 may be detected in the section of the composite power-data cable 560 between splice enclosure 530-1 and splice enclosure 530-2. Responsive to detecting this fault, trunk line relays 595 may be deactivated such that power signals would not be transmitted from output port 550-1 on the section of the composite power-data cable 560 between splice enclosure 530-1 and splice enclosure 530-2.

In some embodiments, for maintenance or upgrade purposes, an operator or a technician may need to remove power from the circuits in splice enclosure 530-1 based on control signals sent by the power sourcing device on the control wires 580 to splice enclosure 530-1 and/or remote powered device 545-1. An operator or technician may enter commands into a terminal associated with the power sourcing device 510 indicating entering of a maintenance mode. Based on control signals sent by the power sourcing device 510 on the control wires 580 to the splice enclosure 530-1, power signals on the composite power-data cable 560 to at least one of the power input port 540-1, the power output port 550-1, or the power tap port 555-1 at splice enclosure 530-1 may be disabled. One or both of the tap relays 590 or the trunk line relays 595 may be deactivated, based on instructions received on the control wires 580. For example, responsive to activation of a maintenance mode of splice enclosure 530-1, tap relays 590 associated with the power tap port 555-1 of the splice enclosure 530-1 may be deactivated.

Referring once again to FIG. 4, power system 400 may include power sourcing devices 410-1 and 410-2. Each of the power sourcing devices 410-1 and 410-2 may provide power signals to the splice enclosures 450-1 to 450-5 through the composite power-data cable 420. Referring to FIG. 5A, a fault condition such as a break in the composite power-data cable 560 may result in an open circuit on at least one of the continuity wires 570 of FIG. 5A on a segment of the composite power-data cable 560 that is between splice enclosures 530-1 and 530-2. The trunk line relays 595 may be deactivated to disable power signals associated with output port 550-1 to the segment experiencing the fault. In some embodiments, deactivating relays associated with the output port 550-1 of splice enclosure 530-1 disconnects the connection to the second power sourcing device 410-2 of FIG. 4.

Figure 5B:
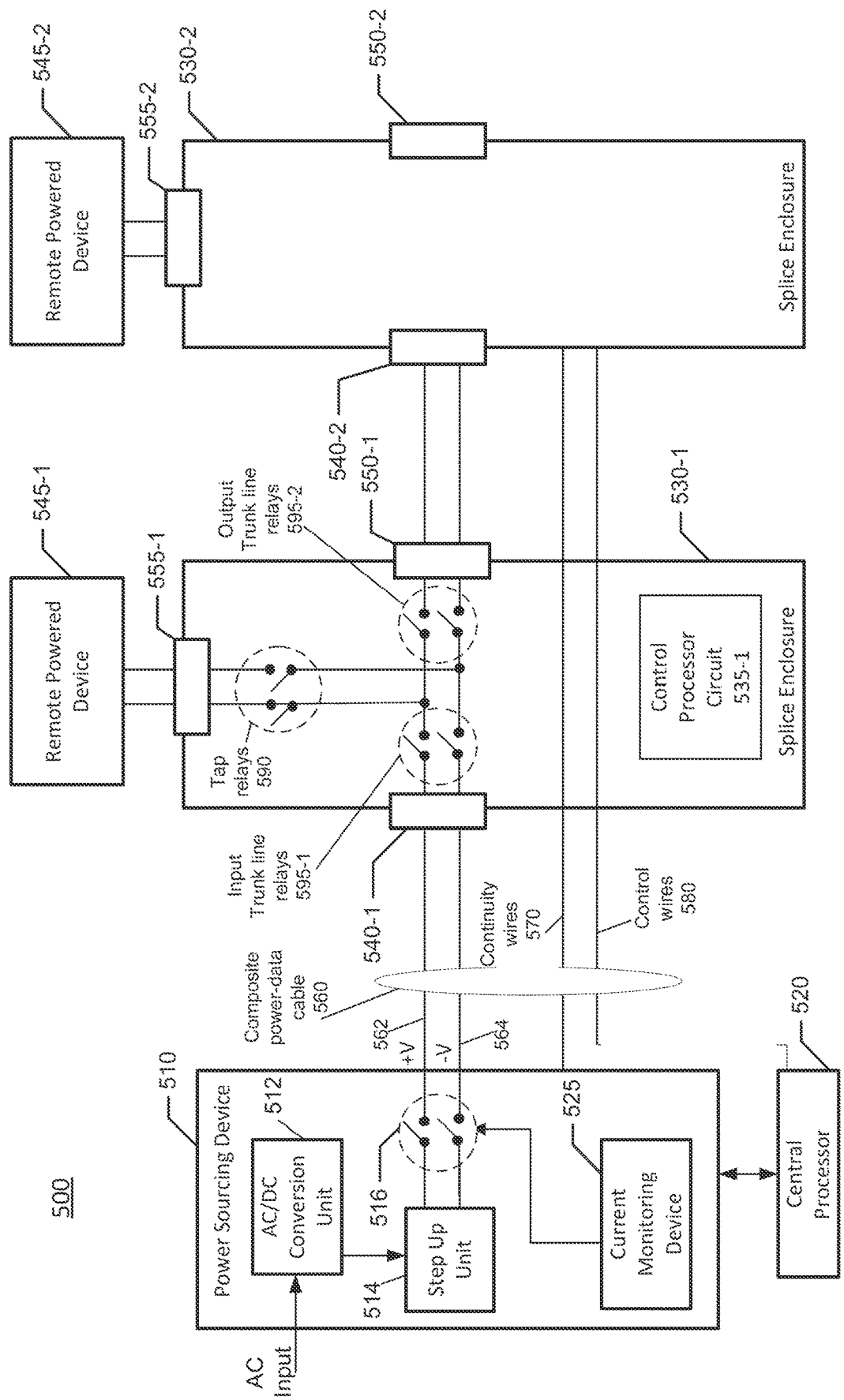

FIG. 5B is a schematic block diagram of power distribution in a power system 500 that may be used in the power and data connectivity micro grids according to some embodiments of the present invention. FIG. 5B illustrates a modified embodiment of the splice enclosure 530-1 of FIG. 5A. Details that are similar to those of FIG. 5A will be omitted. As shown in FIG. 5B, splice enclosure 530-1 may include both input trunk line relays 595-1 that are associated with the input port 540-1 and output trunk line relays 595-2 that are associated with the output port 550-1. If a fault occurs on the power wires 562, 564 of the composite power-data cable 560 between splice enclosure 530-1 and the power sourcing device 510, the input trunk line relays 595-1 at input port 540-1 may be deactivated to prevent current from entering input port 540-1. However, remote powered device 545-1 may continue to be powered by a power sourcing device that is beyond splice enclosure 530-2 (and connected to output port 550-2 of splice enclosure 530-2 via another composite power-data cable 560) such as power sourcing device 410-2 of FIG. 4. If a fault occurs on the power wires 562, 564 of the composite power-data cable 560 between splice enclosure splice enclosure 530-1 and splice enclosure 530-2, the output trunk line relays 595-2 at output port 550-1 may be deactivated to prevent current from entering output port 550-1. In this case, remote powered device 545-1 may continue to be powered by a power sourcing device 510.

In some embodiments, the power system 500 of FIGS. 5A and/or 5B may include a Safety Extra-Low Voltage (SELV) electrical system used at startup of the power system 500 in which the voltage cannot exceed an extra-low voltage, thereby providing minimal risk to humans that may come in contact with a conductor carrying the extra-low voltage. Extra-low voltage is defined in industry standards as a voltage <120 V DC that has minimal risk to technicians working on these power systems. Typically, a SELV DC signal, such as a 60 V DC signal, may be used at startup on the power wires 562, 564 of composite power-data cable 560. As the SELV DC signal flows from the power sourcing device 510 on power wires 562, 564, relays may be sequentially activated (i.e., closed) to allow current flow so that the SELV DC signal can flow along the power wires 562, 564. By sequentially activating the relays, any faults along the power wires 562, 564 may be identified and the location of where the fault is will be known. For example, if no faults are present in the power system 500, the SELV DC signal may propagate first through input port 540-1 to input trunk line relays 595-1 and activate these relays. Then tap relays 590 may be activated, followed by output trunk line relays 595-2. If a fault is identified in a localized area such as, for example, in the tap lines connected to the tap relays 590, the fault is recorded and then the next relay along the power delivery path (here trunk line relays 595) is closed and the process continues. A relay may be opened to isolate the fault if appropriate, while the SELV process continues. However, other lines and relays are tested beyond the faulty tap line. For example, the SELV DC signal may subsequently propagate to splice enclosure 530-2, activating relays thereof. Once the SELV DC voltage has propagated in the power system 500, if no faults were identified, it is deemed safe to turn on the higher voltage operating power signals, such as +/−190 V on power wires 562, 564 to provide power signals to various elements of the power system 500. If faults were identified, the system is disabled until those faults are corrected. However, the SELV powered lines can stay active to maintain control during a fault condition until corrective action is complete and power is restored.

Figure 6:
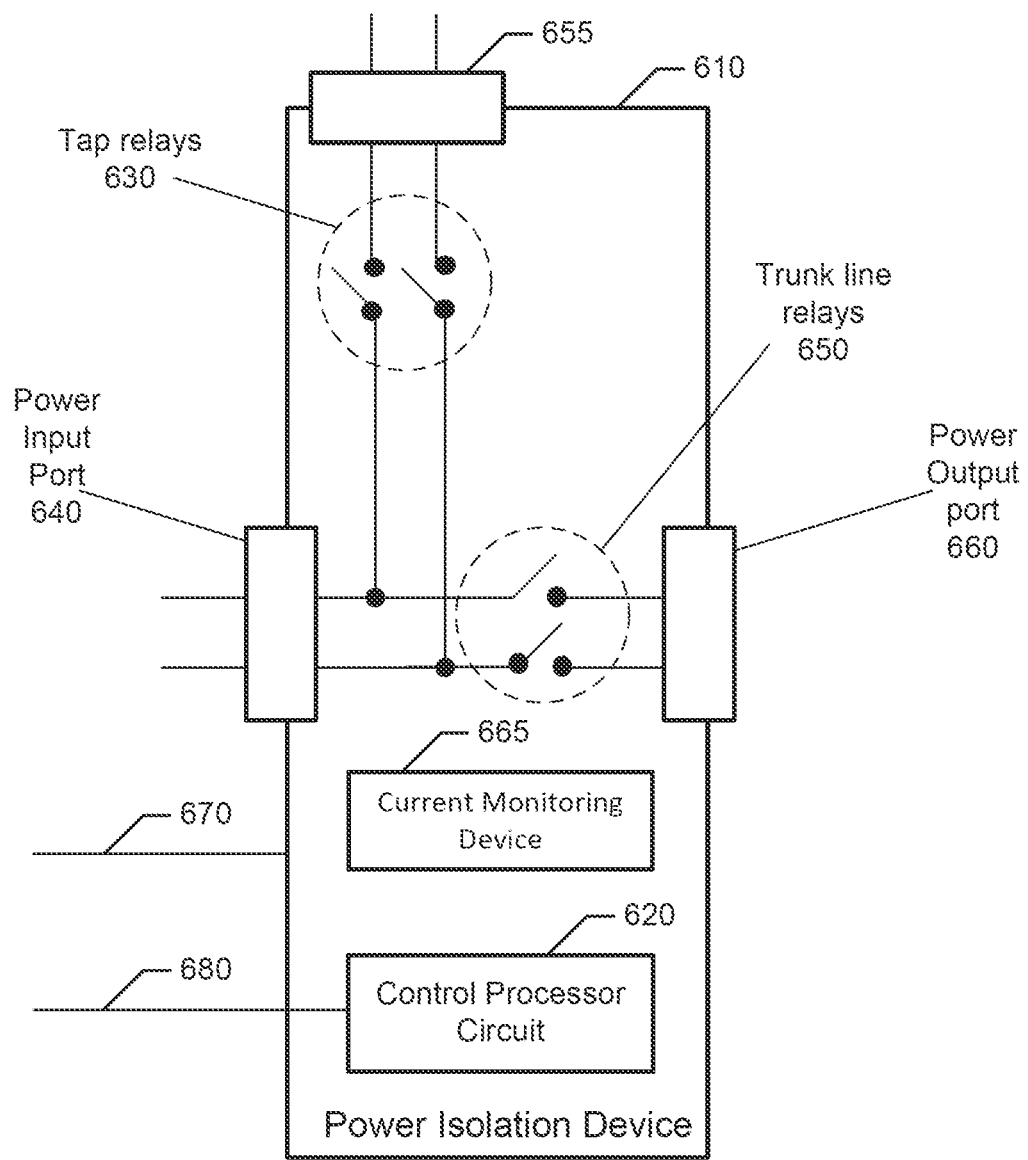
FIG. 6 is a schematic block diagram of power isolation device that may be used in the power and data connectivity micro grids according to embodiments of the present inventive concepts.

FIG. 6 is a schematic block diagram of a power isolation device 610 that may be used in the power system 500 of FIGS. 5A and/or 5B, according to embodiments of the present invention. The description of elements similar to those of FIGS. 5A and/or 5B will not be repeated here in the interest of brevity. Referring to FIG. 6, the power isolation device 610 may be incorporated into or replace the splice enclosure 530 of FIGS. 5A and/or 5B, according to embodiments of the present invention. The power isolation device 610 includes a control processor circuit 620 that communicates over control wires 680 with a central processor 520 associated with a power sourcing device 510, as illustrated in FIGS. 5A and/or 5B. The control processor circuit 620 may receive instructions from the central processor of FIGS. 5A and/or 5B. The power isolation device 610 may be connected to continuity wires 670. The power isolation device 610 includes a power input port 640, a power output port 660, trunk line relays 650 that control the flow of power signals from the power input port 640 to the power output port 660 and/or power signals received by the power output port 660, and tap relays 630 that control the flow of power signals from the power input port 640 to a remote powered device such as the remote powered device 545 of FIGS. 5A and/or 5B.

Figure 7:
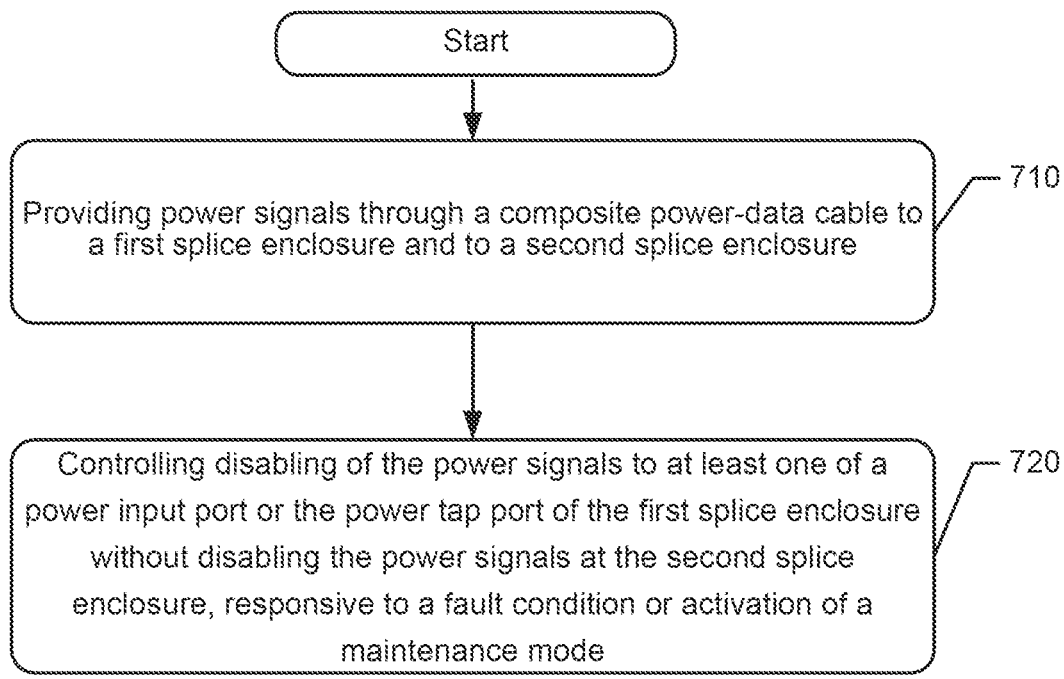
Figure 8:
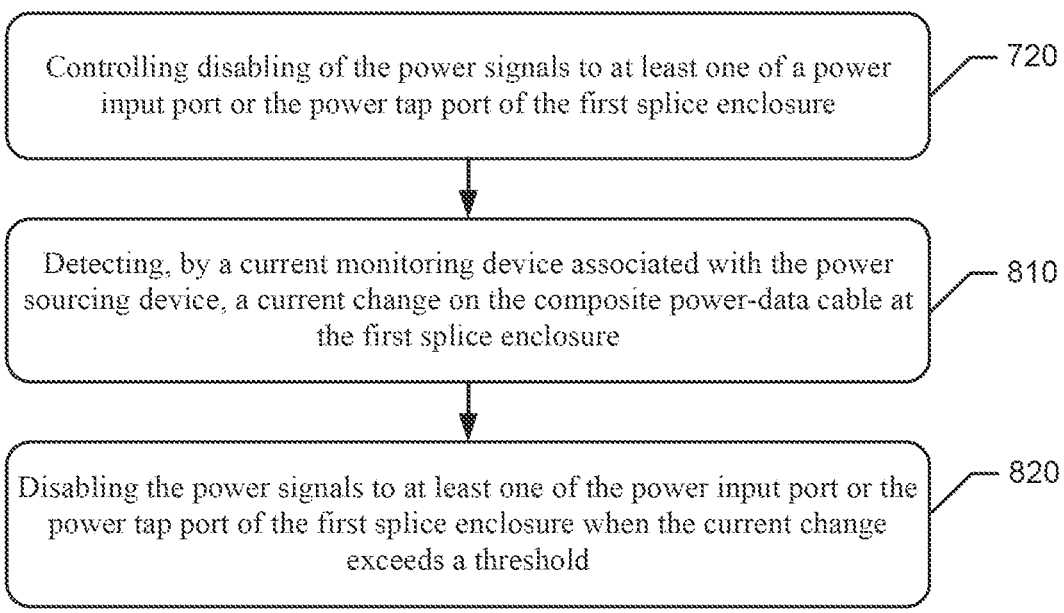

FIGS. 7-12 are flowcharts of operations of a method for providing power from a power sourcing device to a plurality of splice enclosures associated with respective remote powered devices. Referring to FIG. 7, power signals are provided through a composite power-data cable to a first splice enclosure and to a second splice enclosure, at block 710. The power sourcing device controls disabling of the power signals to at least one of the power input port or the power tap port of the first splice enclosure without disabling the power signals at the second splice enclosure, responsive to a fault condition or activation of a maintenance mode, at block 720. Referring to FIG. 8, controlling of the disabling of power signals of block 720 may include detecting, by a current monitoring device associated with the power sourcing device, a current change on the composite power-data cable at the first splice enclosure, at block 810, and disabling the power signals to at least one of the power input port or the power tap port of the first splice enclosure when the current change exceeds a threshold, at block 820.

Referring to FIG. 9 the operations of the method further include communicating with the first splice enclosure and/or the second splice enclosure through control wires in the composite power-data cable, at block 910. Referring to FIG. 10, the operations of the method further include detecting an open circuit on at least one of a plurality of continuity wires in the composite power-data cable, at block 1010, and transmitting, through the control wires, an indication to disable the power signals at the first splice enclosure, responsive to detecting the open circuit, at block 1020.

Figure 11:
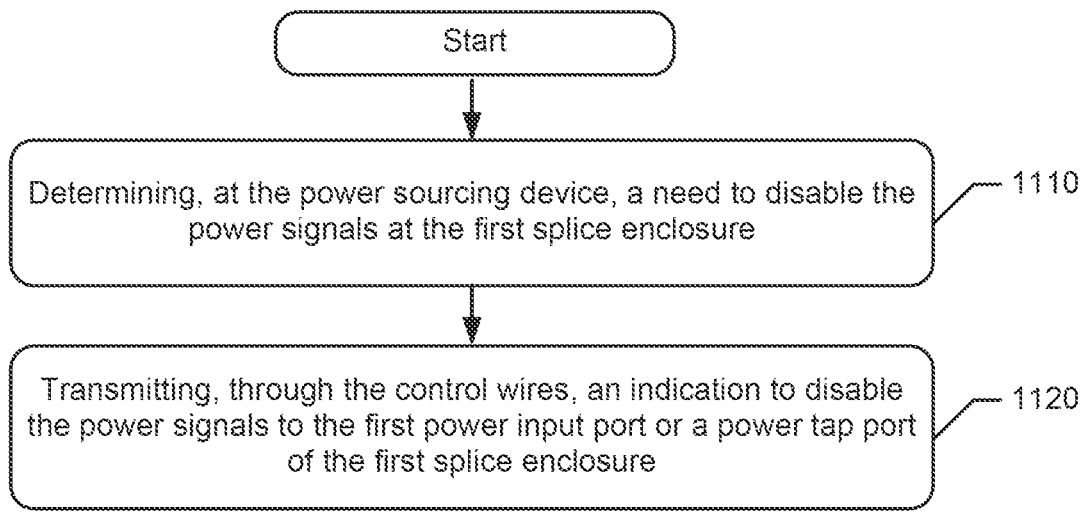
Figure 12:
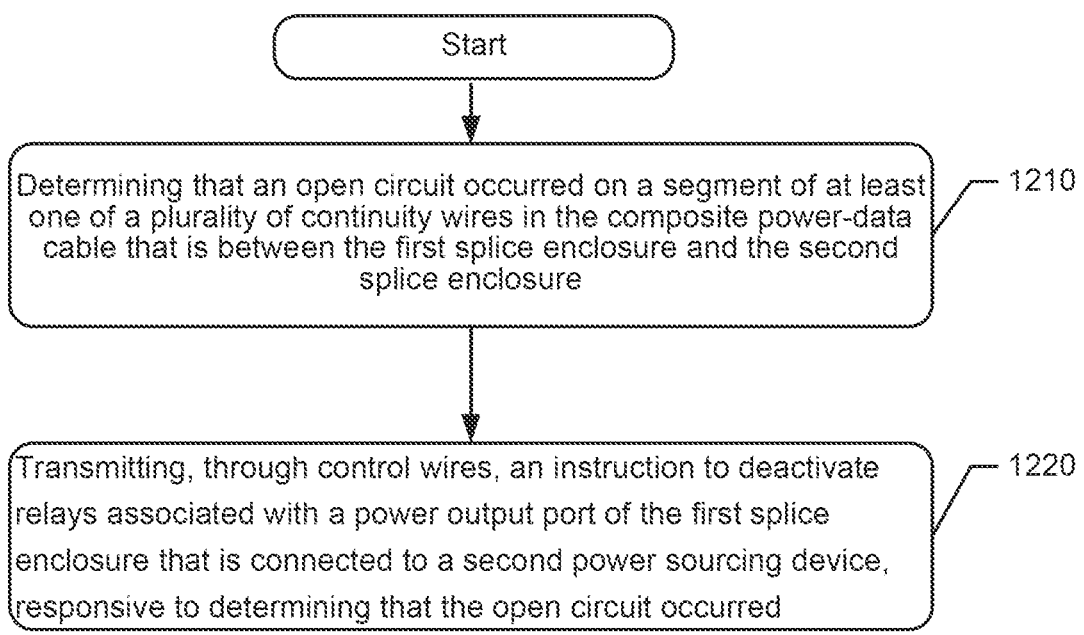

Referring to FIG. 11 the operations of the method include determining, at the power sourcing device, a need to disable the power signals at the first splice enclosure, at block 1110, and transmitting, through the control wires, an indication to disable the power signals to the first power input port or a power tap port of the first splice enclosure, at block 1120. The indication may include an instruction to deactivate relays associated with a power input port of the first splice enclosure. Referring to FIG. 12, the operations of the method include determining that an open circuit occurred on a segment of at least one of a plurality of continuity wires in the composite power-data cable that is between the first splice enclosure and the second splice enclosure, at block 1210, and transmitting, through control wires, an instruction to deactivate relays associated with a power output port of the first splice enclosure that is connected to a second power sourcing device, responsive to determining that the open circuit occurred, at block 1220.

The present invention has been described above with reference to the accompanying drawings. The present invention is not limited to the illustrated embodiments; rather, these embodiments are intended to fully and completely disclose the present invention to those skilled in this art. In the drawings, like numbers refer to like elements throughout. Thicknesses and dimensions of some elements may not be to scale.

Well-known functions or constructions may not be described in detail for brevity and/or clarity. As used herein the expression "and/or" includes any and all combinations of one or more of the associated listed items.

It will be understood that features illustrated with one example embodiment above can be incorporated into any of the other example embodiments. Thus, it will be appreciated that the disclosed embodiments may be combined in any way to provide many additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A power system comprising:
a first power sourcing device;
a first splice enclosure comprising a first power input port, a first power output port, and a first power tap port that is connected to a first remote powered device;
a second splice enclosure comprising a second power input port, a second power output port, and a second power tap port that is connected to a second remote powered device; and
a composite power-data cable configured to carry power signals transmitted from the first power sourcing device to the first splice enclosure and to the second splice enclosure; and
a second power sourcing device connected to the composite power-data cable,
wherein the first power sourcing device is configured to disable the power signals to at least one of the first power input port, the first power output port, or the first power tap port of the first splice enclosure,
wherein the composite power-data cable comprises:
power wires that carry the power signals;
control wires configured for communication between the first power sourcing device, the first splice enclosure, and the second splice enclosure; and
continuity wires connected to the first splice enclosure and the second splice enclosure.

2. The power system of claim 1, further comprising:
a current monitoring device configured to detect a current change on the composite power-data cable at the first splice enclosure.

3. The power system of claim 2, wherein the first power sourcing device is configured to disable the power signals to the first power input port of the first splice enclosure when the current change on the composite power-data cable at the first splice enclosure exceeds a threshold.

4. A power system comprising:
a power sourcing device;
a first splice enclosure comprising a first power input port, a first power output port, and a first power tap port that is connected to a first remote powered device;
a second splice enclosure comprising a second power input port, a second power output port, and a second power tap port that is connected to a second remote powered device; and
a composite power-data cable configured to carry power signals transmitted from the power sourcing device to the first splice enclosure and to the second splice enclosure,
wherein the power sourcing device is configured to disable the power signals to at least one of the first power input port, the first power output port, or the first power tap port of the first splice enclosure,
wherein the composite power-data cable comprises:
power wires that carry the power signals;
control wires configured for communication between the power sourcing device, the first splice enclosure, and the second splice enclosure; and
continuity wires connected to the first splice enclosure and the second splice enclosure,
wherein the control wires are spaced apart from one another in a cross-sectional view of the composite power-data cable,
wherein the continuity wires are spaced apart from one another in the cross-sectional view of the composite power-data cable, and
wherein ones of the continuity wires alternate with ones of the control wires in the cross-sectional view of the composite power-data cable.

5. A method of providing power from a power sourcing device to a plurality of splice enclosures associated with respective ones of a plurality of remote powered devices, the method comprising:
providing power signals through a composite power-data cable to a first splice enclosure and to a second splice enclosure of the plurality of splice enclosures, wherein the composite power-data cable comprises:
power wires that carry the power signals;
control wires configured for communication between the power sourcing device, the first splice enclosure, and the second splice enclosure; and
continuity wires connected to the first splice enclosure and the second splice enclosure; and
controlling, by the power sourcing device, disabling of the power signals to at least one of a power input port or a power tap port of the first splice enclosure,
wherein the control wires are spaced apart from one another in a cross-sectional view of the composite power-data cable,
wherein the continuity wires are spaced apart from one another in the cross-sectional view of the composite power-data cable, and
wherein ones of the continuity wires alternate with ones of the control wires in the cross-sectional view of the composite power-data cable.

6. The method of claim 5, further comprising detecting a current change on the composite power-data cable at the first splice enclosure using a current monitoring device.

7. The method of claim 6, further comprising disabling the power signals to the power input port of the first splice enclosure when the current change on the composite power-data cable at the first splice enclosure exceeds a threshold.

\* \* \* \* \*